United States Patent [19]

Huddleston

[11] Patent Number: 5,417,759
[45] Date of Patent: May 23, 1995

[54] SET RETARDING ADDITIVE FOR CEMENT SLURRIES

[75] Inventor: David A. Huddleston, Sugar Land, Tex.

[73] Assignee: Nalco Chemical Company, Naperville, Ill.

[21] Appl. No.: 264,288

[22] Filed: Jun. 23, 1994

[51] Int. Cl.⁶ ............................................. C04B 24/00
[52] U.S. Cl. ................................... 106/727; 106/729; 106/804; 106/806; 106/810; 106/823; 106/717; 106/102; 106/808; 166/294; 524/650
[58] Field of Search ............... 106/806, 810, 724, 823, 106/729, 804, 162, 717, 727, 808; 524/650; 166/294

[56] References Cited

U.S. PATENT DOCUMENTS

| | | | |
|---|---|---|---|
| 4,225,361 | 9/1980 | Joseph | 106/776 |
| 4,466,836 | 8/1984 | Crump et al. | 106/717 |
| 4,596,765 | 6/1986 | Kurematsu et al. | 430/467 |
| 4,676,832 | 6/1987 | Childs et al. | 106/806 |
| 4,964,917 | 10/1990 | Bobrowski et al. | 106/806 |
| 5,069,798 | 12/1991 | Hwa et al. | 210/700 |
| 5,215,585 | 6/1993 | Luthra et al. | 106/806 |

*Primary Examiner*—Mark L. Bell
*Assistant Examiner*—Michael Marcheschi
*Attorney, Agent, or Firm*—Robert A. Miller; James J. Drake

[57] ABSTRACT

N-phosphonomethyl iminodiacetic acid may be used as an additive to retard the setting time of Portland cement.

8 Claims, No Drawings

SET RETARDING ADDITIVE FOR CEMENT SLURRIES

FIELD OF THE INVENTION

This invention is related to a process for retarding the set times of cement and more particularly hydraulic cements used in oilfield operations by adding to the cement, prior to its setting, a cement setting retarding mount of N-phosphonomethyl iminodiacetic acid.

INTRODUCTION

Hydrophobic substituted phosphonic or phosphinic acids and their alkaline metal salts have been used in cements, primarily soil/cement mixtures, to improve the freeze-thaw properties and salt resistance. Six to eighteen carbon alkyl phosphonic acids or their alkali metal salts are so described in U.S. Pat. No. 3,794,506. A plugging mixture for high temperature oil and gas wells comprising portland cement and 1-hydroxy ethylidene diphosphonic acid, trisodium of tripotassium salts as set extenders is described in Derwent Abstract 71376B/39 (1979) of U.S.S.R. Patent No. 640,019. The use of these phosphonate salts at temperatures of from 75°–150° C. in amounts of from 0.1–0.3 percent by weight is described in the abstract.

U.S. Pat. No. 4,466,836 discloses the use of certain methylene phosphonic acid derivatives as cement set retarders in aqueous cement slurries. These materials may generally be categorized as the phosphonomethylated reaction product of a dihalo or halo-epoxy organic compound with aminoethylpiperazine.

Other organic phosphorous acid derivatives are taught to be useful additives in cement compositions as turbulence-inducing and flow property improver additive, e.g. U.S. Pat. Nos. 3,964,921 and 4,040,854 respectively. Another turbulence-inducer is a pyrolysis product of urea and a bis(alkylenepyrophosphate) such as that described in U.S. Pat. No. 3,409,080.

Alkylene diphosphonic acids and their water soluble salts are described as set time extenders and water reducing agents for gypsum plasters, such as those in U.S. Pat. No. 4,225,361. Lignins which have been phosphonoalkylated through an ether linkage or corresponding sulfonates, sulfides, hydroxyl or amine derivatives are taught to be useful as dispersants or surfactants in U.S. Pat. No. 3,865,803. These materials are also said to be useful as cement additives, but without indicating specific uses.

Ultra-rapid hardening portland cement compositions are described which contain various acid salt additives in U.S. Pat. No. 4,066,469. This reference states that the use of acid phosphates as the acid salt additives are excluded since the phosphates have a characteristically retarding property peculiar to them.

The principal components of portland cement are lime, silica, alumina, and iron. These components form the following complex compounds: tricalcium aluminate, tetracalcium aluminoferrite, tricalcium silicate and dicalcium silicate.

When water is added to cement, setting and hardening reactions begin immediately. The chemical compounds in the cement undergo the process of hydration and recrystallization which results in a set product. The maximum amount of water which can be used with an oil-well cement is the amount which can be added before solid separation occurs. The minimum amount of water is the amount required to make the slurry pumpable. Therefore, the normal water ratio is governed by the maxima and minimum limits for a particular class of cement.

Thickening time is the time that the cement remains pumpable in the well. This is the most critical property of an oil-well cement. The thickening time has to be long enough so as to permit the cement to be pumped into place and short enough to permit operations to resume quickly. Generally, a thickening time of three to five hours is desirable. A thickening time of four hours often provides the necessary placement time plus a safety factor. Only occasionally, it is desired that this time be extended to five or more hours.

Other factors, such as fluid loss, viscosity, and density must be taken into consideration and additives are known to those skilled in the art which effect each of these factors as well as that of setting or thickening time as mentioned above. Another parameter which has an effect on set time is temperature. Cement sets more rapidly as temperature increases. Temperature must be taken into consideration, particularly when pumping cement into deeper wells, since temperature increases as the depth of the well becomes greater. Temperature also effects the strength of the cement, the strength generally becoming less as the temperature increases. Because of the temperature effect, it is important to retard the setting of the cement employed in deeper wells.

It has now been discovered that N-phosphonomethyl iminodiacetic acid is useful in aqueous cement slurries as a set retarding additive.

SUMMARY OF THE INVENTION

N-phosphonomethyl iminodiacetic add has been found to be useful as set retarder in aqueous cement slurries. N-phosphonomethyl iminodiacetic acid may also be blended with other compounds.

DETAILED DESCRIPTION OF THE INVENTION

N-phosphonomethyl iminodiacetic acid and blends of N-phosphonomethyl iminodiacetic acid with other set retarding agents is useful in retarding the setting of cement particularly in oilfield operations. N-phosphonomethyl iminodiacetic acid is a material commercially available from Hampshire Chemical Corporation, Lexington, Mass.

In the practice of the invention, the N-phosphonomethyl iminodiacetic acid is used at a level to be effective in retarding the setting of cement slurries. Generally, the N-phosphonomethyl iminodiacetic acid is used at a level of from 0.01 to 1.0 and most preferably from 0.01 to 0.75 weight percent based on the weight of the dry cement. Most preferably, from 0.02 to 0.5% by weight of neat N-phosphonomethyl iminodiacetic acid is used based upon the weight of the dry cement.

In the practice of this invention, the N-phosphonomethyl iminodiacetic acid may be blended with other compounds that enhance its use at higher temperatures. The other additives employed for this purpose are generally saccharides and polysaccharides and their acid derivatives, and salts thereof including guar, guar derivatives, hydroxyethyl cellulose, carboxymethyl cellulose, sodium gluconate, and other related materials.

As stated earlier, the N-phosphonomethyl iminodiacetic acid materials of the subject invention are particularly useful in applications where the cement is employed at higher temperatures. It has been found that the N-phosphonomethyl iminodiacetic acid material is effective as a cement set retarder at temperatures ranging from 150°–270° F. or higher and more preferably 180°–230° F.

The additives of the subject invention are useful as cement set retarders in all normal commercial grades of portland cements and particularly those portland cements useful as oil well cementing agents. The additives are effective when traditional portland cements are mixed with such additives as silica flour, bentonite, and the like.

In actual practice, the cement set retarders of this invention may be added to the water used to make the cement slurry, or they may be blended into the portland cement itself prior to water addition, Alternatively, the additives are blended with a solid such as silica flour or perlite and the resultant admixture is blended into the dry cement. One of the most important features of the additive of the instant invention is that it is a solid, crystalline material at normal temperatures and may thus be blended into the dry cement by simple mixing or blending techniques. Most other cement set retarding additives are liquid at normal temperatures, and are thus more difficult to uniformly blend into cement. The crystalline additive of this invention may thus be mixed into cement blends and shipped to job sites pre-mixed, eliminating the need to measure and formulate the cement set retarding additive at the job site.

If the additives of this invention are to be added to the water used to make the cement slurry, it is usually dissolved in water and fed into the water as a dilute solution of from 1–25% by weight.

In order to illustrate the invention, the following examples are presented:

EXAMPLES

Test slurries were prepared in accordance with American Petroleum Institute SPEC 10, section 5 (5th Edition Jul. 1, 1990). The test apparatus utilized was a pressurized cement consistometer, model PC-10, from NOWSCO Well Services. The apparatus differs from the API recommended consistometer in that the paddle rotates instead of the slurry cup and heat is applied directly to the walls of the slurry cup with heating elements. In each example the slurry was mixed and poured into the consistometer cup. The cup was sealed and stirred at 150 rpm, The pressure was raised to about 2000 psig with mineral oil contained in the head space of the slurry cup. The test temperature simulated the bottom hole circulating temperature of the cement in a well. The time to reach the test temperature was taken from the casing-cementing well-simulation tests table in API SFEC 10. The geothermal gradient was assumed to be 1.5° F./100 ft. depth. The pressure was adjusted to 10,000 psig after reaching the test temperature. The thickening time was reported as the time necessary to reach 100 Bearden units of consistency. Results are shown in the attached table.

TABLE 1

| Example | Temp/ °F. | (1) % Retarder | Thickening Time (Min.) | Slurry Type | Other Additives % |
|---|---|---|---|---|---|
| 1 | 180 | 0.028 | 204 | 38% $H_2O$ | 0 |
| 2 | 180 | 0.030 | 219 | 38% $H_2O$ | 0 |
| 3 | 180 | 0.032 | 220 | 38% $H_2O$ | 0 |
| 4 | 180 | 0.032 | 255 | 38% $H_2O$ | Borax 0.032 |
| 5 | 180 | 0.035 | 288 | 38% $H_2O$ | Borax 0.035 |
| 6 | 205 | 0.070 | 262 | 35% $SiO_2$; 53% $H_2O$ | 0 |
| 7 | 205 | 0.080 | 316 | 35% $SiO_2$; 53% $H_2O$ | 0 |
| 8 | 220 | 0.080 | 173 | 35% $SiO_2$; 53% $H_2O$ | 0 |
| 9 | 220 | 0.110 | 220 | 35% $SiO_2$; 53% $H_2O$ | 0 |
| 10 | 220 | 0.150 | 301 | 35% $SiO_2$; 53% $H_2O$ | 0 |
| 11 | 220 | 0.250 | 323 | 35% $SiO_2$; 53% $H_2O$ | 0 |
| 12 | 230 | 0.130 | 225 | 35% $SiO_2$; 53% $H_2O$ | 0 |
| 13 | 230 | 0.130 | 232 | 35% $SiO_2$; 53% $H_2O$ | Borax 0.13 |
| 14 | 270 | 0.500 | 159 | 38% $H_2O$ | neat |

(1) Neat N-phosphonomethyl iminiodiacetic acid

Without any set retarder additive, thickening times for the cements utilized were reported by their manufacturers to generally be about 115 minutes at a maximum 160° F. temperature.

EXAMPLE 15

The amount of the additive of this invention which would be required to obtain a four hour thickening time versus temperature was evaluated in comparison to two commercially available cement set retarding additives. The additive of this invention, N-phosphonomethyl iminodiacetic acid was tested on a API Class H cement slurry in accordance with Examples 1–14 above. The slurry contained 38% water and varying percentages of N-phosphonomethyl iminiodiacetic acid, based on the weight of dry cement at 180° F. 35% silica flour, 53% water, and varying percentages of N-phosphonomethyl iminiodiacetic acid were added at 205° F., and 230° F. respectively. Data in Table 1 indicates a four hour thickening time could be obtained at 180°, 205°, and 230° F. with 0.033%, 0.065%, and 0.14% N-phosphonomethyl iminiodiacetic respectively. This data was compared to data published on HR-5, a lignosulfonate based retarder offered for sale by Halliburton Energy Services, Inc, Houston, Tex., and on R-5, a calcium lignosulfonate based retarder offered for sale by Services, Tomball, Tex. This data indicates that 0.4% and 0.55% weight percent of HR-5 was required for 4 hour thickening times at 180° and 205° F. respectively, and that 0.25–0.4% by weight of R-5 was required for a 4 hour thickening time at 180°–200° F. R-5 was not recommended by BJ Services for use above 200° F. unless proven effective in a particular cement. This data confirms the unique high temperature set retarding ability of the material of the instant invention in comparison to the above mentioned commercial materials.

Having thus described by invention, I claim:

1. A process for retarding the setting of an aqueous portland cement slurry which comprises adding to said slurry a set retarding amount of N-phosphonomethyl iminodiacetic acid.

2. A process for retarding the setting of aqueous oilfield cement slurries at temperatures of from 150°–270° F. which comprises adding to the cement slurry a set retarding amount of N-phosphonomethyl iminodiacetic acid.

3. The process of claim 2 wherein the temperature is from 180°–230° F.,

4. The process of claim 2 wherein from 0.01 to 1.0 weight percent of the N-phosphonomethyl iminodiacetic acid is added based on the weight of the portland cement prior to water addition.

5. The process of claim 2 wherein from 0.01 to 0.75 weight percent of the N-phosphonomethyl iminodiacetic acid is added based on the weight of the portand cement prior to water addition.

6. The process of claim 2 wherein from 0.02 to 0.5 weight percent of the N-phosphonomethyl iminodiacetic acid is added based on the weight of the portand cement prior to water addition.

7. The process of claim 4 wherein the N-phosphonomethyl iminodiacetic acid is added to the cement slurry along with another cement set retarder selected from the group consisting of guar, hydroxyethyl cellulose, carboxymethyl cellulose, sodium gluconate, and calcium lignosulfonate.

8. The process of claim 4 wherein the N-phosphonomethyl iminodiacetic acid is added to the cement slurry along with sodium gluconate.

* * * * *